US012015909B2

(12) United States Patent
Han et al.

(10) Patent No.: US 12,015,909 B2
(45) Date of Patent: Jun. 18, 2024

(54) METHOD AND SYSTEM FOR HEAD-RELATED TRANSFER FUNCTION ADAPTATION

(71) Applicant: HARMAN INTERNATIONAL INDUSTRIES, INCORPORATED, Stamford, CT (US)

(72) Inventors: Xiaonan Han, Guangdong (CN); Shao-Fu Shih, Mountain View, CA (US); Jianwen Zheng, Guangdong (CN); Ming Zhou, Guangdong (CN)

(73) Assignee: Harman International Industries, Incorporated, Stamford, CT (US)

( * ) Notice: Subject to any disclaimer, the term of this patent is extended or adjusted under 35 U.S.C. 154(b) by 75 days.

(21) Appl. No.: 17/637,674

(22) PCT Filed: Sep. 4, 2020

(86) PCT No.: PCT/CN2020/113426
§ 371 (c)(1),
(2) Date: Feb. 23, 2022

(87) PCT Pub. No.: WO2021/043248
PCT Pub. Date: Mar. 11, 2021

(65) Prior Publication Data
US 2022/0279304 A1 Sep. 1, 2022

(30) Foreign Application Priority Data
Sep. 5, 2019 (CN) ......................... 201910835986.7

(51) Int. Cl.
*H04S 7/00* (2006.01)
*G10K 11/178* (2006.01)
*H04R 1/10* (2006.01)

(52) U.S. Cl.
CPC ........ *H04S 7/304* (2013.01); *G10K 11/17823* (2018.01); *G10K 11/17825* (2018.01); *G10K 11/17881* (2018.01); *H04R 1/1083* (2013.01); *G10K 2210/1081* (2013.01);
(Continued)

(58) Field of Classification Search
None
See application file for complete search history.

(56) References Cited

U.S. PATENT DOCUMENTS 10,034,092 B1 7/2018 Nawfal et al.
2009/0086988 A1 4/2009 Ou et al.
2014/0044275 A1 2/2014 Goldstein et al.
(Continued)

FOREIGN PATENT DOCUMENTS

CN 104010265 A 8/2014
WO 2013111038 A1 8/2013
WO 2015134658 A1 9/2015

OTHER PUBLICATIONS

International Search Report dated Dec. 16, 2020 for PCT Appn. No. PCT/CN2020/113426 filed Sep. 4, 2020, 9 pgs.
(Continued)

*Primary Examiner* — Kenny H Truong
(74) *Attorney, Agent, or Firm* — Brooks Kushman P.C.

(57) ABSTRACT

The disclosure provides a method and a system for head-related transfer function (HRTF) adaptation. The method includes performing a system identification. The system identification includes a pinna identification and a shadowing identification.

16 Claims, 5 Drawing Sheets

(52) U.S. Cl.
CPC ................ *G10K 2210/3026* (2013.01); *G10K 2210/3027* (2013.01); *H04R 2460/01* (2013.01); *H04S 2420/01* (2013.01)

(56) References Cited

U.S. PATENT DOCUMENTS

| | | | | |
|---|---|---|---|---|
| 2017/0094440 | A1* | 3/2017 | Brown | H04S 7/30 |
| 2018/0190260 | A1 | 7/2018 | Christoph | |

OTHER PUBLICATIONS

Rund, F. et al., "Alternatives to HRTF Measurement", 2012 35th International Conference on Telecommunications and Signal Processing, Dec. 31, 2012, 5 pgs., sections I-IV.
Extended European Search Report dated Aug. 16, 2023 for European Patent Application No. 20860843.0, 9 pages.
Garas, J., "Adaptive 3D Sound Systems", Jan. 1, 1999, 82 pgs.

* cited by examiner

METHOD AND SYSTEM FOR HEAD-RELATED TRANSFER FUNCTION ADAPTATION

CROSS-REFERENCE TO RELATED APPLICATIONS

This application is the U.S. national phase of PCT Application No. PCT/CN2020/113426 filed on Sep. 4, 2020, which claims priority to Chinese Patent Application No. 201910835986.7 filed on Sep. 5, 2019, the disclosures of which are hereby incorporated in their entirety by reference herein.

TECHNICAL FIELD

The present disclosure relates to the field of audio, and more particularly, to a method and a system for head-related transfer function (HRTF) adaptation using a hybrid adapted active noise canceller (ANC) loop.

BACKGROUND

In the past few years, ANC earphones have become more and more popular. The reason is that the ANC earphones can provide users with a relatively quiet environment in a noisy environment, reduce unnecessary environmental noise, and thus bring more convenience and comfort to users.

As people's requirements for user experience continue to increase, a spatial audio technology (also known as a 3D audio technology) has received more attention and use. This technology makes it possible to create a 3D audio experience through the use of earphones. Applications of this technology include achieving augmented virtual reality, listening to music, and watching movies on a tablet or a PC, etc. A virtual surround earphone is a typical application of the 3D audio technology. When a surround sound is presented through a 3D audio earphone, the same audio experience as listening to an actual speaker system will be produced.

An HRTF is an advanced way of presenting a 3D audio, so that the sound appears to be from a specific point in a 3D space to synthesize a binaural audio. In order to achieve the fidelity and immersive experience during binaural audio reproduction, the HRTF is often used as a filter to describe the sound transmission from a sound source to the eardrums of a listener.

An ANC earphone is another typical application, which uses an HRTF from a noise source to an ear entrance point (EEP), and introduces sound waves with matched amplitudes but opposite phases to reduce the severity of noise pollution (such as street noise, aircraft engine noise, and office chatters).

In a word, the HRTF is highly personalized and will vary from individual to individual. Everyone has different upper body contours and different ear shapes, so they also have different acoustic filtering effects. In current practice, an average HRTF from a group of subjects is usually used offline and on earphones. This method of using the average HRTF has two disadvantages:

1) Once there is a situation where the average HRTF can hardly match an end actual user, a very poor sound localization effect will appear due to a front-back and up-down confusion (a so-called confusion cone) related to a 3D audio.

2) Although modifying the non-personalized average HRTF may be less labor intensive, is the non-personalized average HRTF is always accompanied by undesirable audio distortion.

The existing HRTF measurement includes using a set of speakers mounted on a semicircular rotating ring to generate excitation signals (for example, exponential sweep signals). A dummy head or an individual head is placed in the center of the semicircular ring, and microphones are provided in the eardrums of the left and right ears of the dummy head or the individual head. However, such measurement is very difficult and time consuming.

In addition, current ANC designs either use a fixed HRTF/offline HRTF, or require dedicated hardware, and the cost is much higher. Further, the ANC design with a fixed HRTF has the following two shortcomings: 1) it cannot accurately adapt to different environmental noises in the real world based on on-site calibration/measurement; and 2) user personalization cannot be achieved, for example, human differences between earphones lead to inconsistent results of ANCs and, for example, leakage is caused due to various different fitting states of the earphones and the wearer's head.

In order to overcome the above shortcomings of an inaccurate and non-personalized HRTF, an improved solution is needed.

SUMMARY OF THE INVENTION

The present disclosure provides a solution to obtain, for example, an adapted HRTF from a far field to a near field, and from an ear reference point (ERP) to an ear entrance point (EEP) through an adapted ANC. In addition, in another implementation of the present disclosure, the adapted HRTF will be used for compensation in applications such as ANC earphone applications and 3D earphone applications. In addition, the present disclosure can provide a hybrid (feedback+feedforward) adapted ANC to adapt to different adaptation states.

According to one or more aspects of the present disclosure, a method for HRTF adaptation is provided. The method includes: performing a system identification. The system identification includes a pinna identification and a shadowing identification. The method provided according to one or more aspects of the present disclosure further includes: performing a system compensation, based on an adapted HRTF obtained from the system identification. The method provided according to one or more aspects of the present disclosure further includes: generating an HRTF rendering matrix based on the pinna identification and the shadowing identification.

According to one or more aspects of the present disclosure, a system for an HRTF adaptation is provided. The system includes a memory and a processor. The memory is configured to store computer-readable instructions. The processor is configured to perform a system identification when executing the computer-readable instructions. The system identification includes a pinna identification and a shadowing identification.

Another embodiment of the present disclosure provides a computer-readable medium configured to perform the steps of the above method.

Advantageously, the method and the system disclosed in the present disclosure can provide a personalized HRTF according to different users, so that users can obtain a better sound experience when using earphones.

DESCRIPTION OF THE DRAWINGS

The present disclosure can be better understood by reading the following description of non-limiting implementations with reference to the accompanying drawings. The parts in the figures are not necessarily to scale, but the focus is placed on explaining the principle of the present invention. In addition, in the figures, similar or identical reference numerals refer to similar or identical elements.

DETAILED DESCRIPTION

Figure 1:
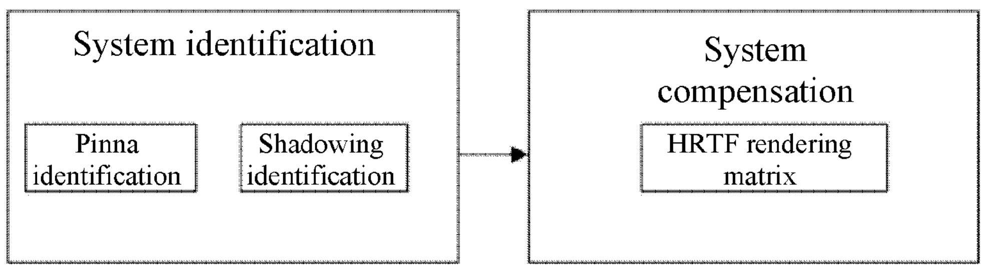
FIG. 1 illustrates a schematic diagram of a method and a system of the present disclosure.

It should be understood that the following description of the embodiments is given for illustrative purposes only, and not restrictive. The division of examples in the functional blocks, modules, or units shown in the drawings should not be construed as representing these functional blocks, and these modules or units must be implemented as physically separated units. The functional blocks, modules, or units shown or described can be implemented as individual units, circuits, chips, functions, modules, or circuit elements. One or more functional blocks or units can also be implemented in a common circuit, chip, circuit element, or unit.

Any one or more of the processor, memory, or system described herein includes computer-executable instructions that may be compiled or interpreted from computer programs created using various programming languages and/or technologies. Generally speaking, a processor (such as a microprocessor) receives and executes instructions, for example, from a memory, a computer-readable medium, etc. The processor includes a non-transitory computer-readable storage medium capable of executing instructions of a software program. The computer-readable medium may be, but is not limited to, an electronic storage device, a magnetic storage device, an optical storage device, an electromagnetic storage device, a semiconductor storage device, or any suitable combination thereof.

FIG. 1 illustrates a schematic diagram of a method and a system of the present disclosure. As shown in FIG. 1, the present disclosure provides a method and a system for HRTF adaptation. The method may include a system identification and a system compensation. The system identification aims to determine a difference between a reference model and a user. The system identification mainly focuses on a pinna difference and a shadowing function. That is, the system identification may include a pinna identification and a shadowing identification. The system compensation aims to use mathematical modeling methods to compensate for a system difference between the reference model and the user. For example, an HRTF rendering matrix is generated based on the output of the pinna identification and the shadowing identification.

Figure 6:
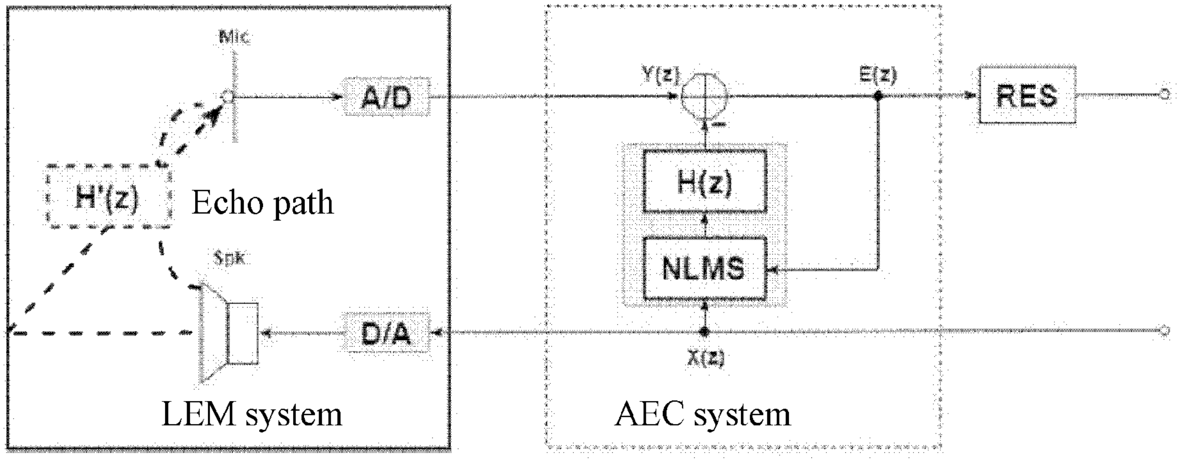
FIG. 6 illustrates a schematic diagram of an acoustic echo cancellation system H(Z) implemented in a frequency domain (FD)

For the system identification, reference may be made to an acoustic echo canceller (AEC) in a telecommunication system for modeling. For the convenience of illustration, FIG. 6 illustrates a schematic diagram of an acoustic echo cancellation system H(Z) implemented in an FD. The principle description will be performed later with reference to FIG. 6. In an embodiment of the present disclosure, by using an echo path identification algorithm, such as a normalized least mean square (NLMS) algorithm, a TF from a speaker (horn) spk to an internal microphone (that is, a pinna identification from an ERP to an EEP) and a TF from an external microphone to the internal microphone (that is, a shadowing identification from a far field to the EEP) can be obtained.

Pinna Identification (ERP to EEP)

Figure 2:
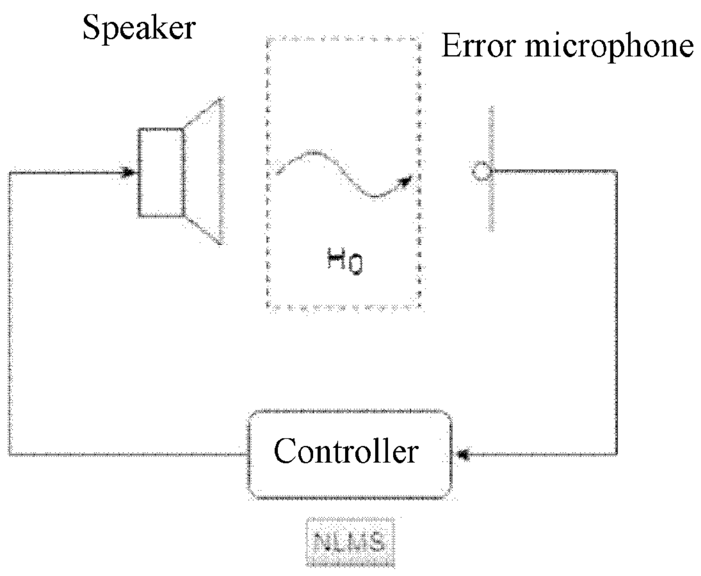
FIG. 2 illustrates a schematic diagram of an ANC feedback loop of an embodiment of the present disclosure.

The pinna identification (ERP to EEP) of one aspect of the present disclosure will be described below with reference to FIG. 2. FIG. 2 illustrates a schematic diagram of an ANC feedback loop. For the convenience of understanding, a system model of a pinna identification in the present disclosure will be described by taking the ANC feedback loop in FIG. 2 as an example. As shown in FIG. 2, for the convenience of description, for example, the position of a speaker (horn) spk is defined as an ERP, the position of an error microphone is defined as an EEP, and an HRTF from the ERP to the EEP is defined as $H_0$. A controller may be implemented as an AEC system. For a more intuitive understanding, the AEC system shown in FIG. 6 is taken as an example for description. For example, the controller may implement an NLMS-based adapted algorithm.

In order to describe an individual difference (HRTF) between the pinna (speaker (spk) at the ERP) and the ear canal (error microphone (mic) at the EEP) that affects the spatial fidelity, a feedback loop in FIG. 2 needs to be used to separately apply an HRTF compensation curve (that is, an inversed function of $H_0$).

Next, the process of the pinna identification will be described in detail.

First, the HRTF from the ERP to the EEP ($H_0$) is obtained. This process may be implemented in two ways. One way includes: capturing any reference audio signal from the earphone spk, recording the signal by the error microphone, and then transforming the signal from a time domain (TD) to an FD through fast Fourier transform (FFT). Another way includes: obtaining the adapted HRTF ($H_0$) using an AEC adapted loop. For the convenience of understanding, FIG. 6 illustrates an adapted AEC using NLMS. Those skilled in the art can understand that the present disclosure may also use an AEC adapted loop using other adapted algorithms (such as RLS and VLMS).

Next, an HRTF compensation curve ($H_0^{-1}$) is obtained by curve fitting of $H_0$. For example, if a known filter is given, curve fitting may be modeled as an arbitrary amplitude filter design.

Finally, an audio signal in the FD is multiplied by the HRTF compensation curve ($H_0^{-1}$) before is the audio signal is reproduced through the speaker spk.

Figure 3:
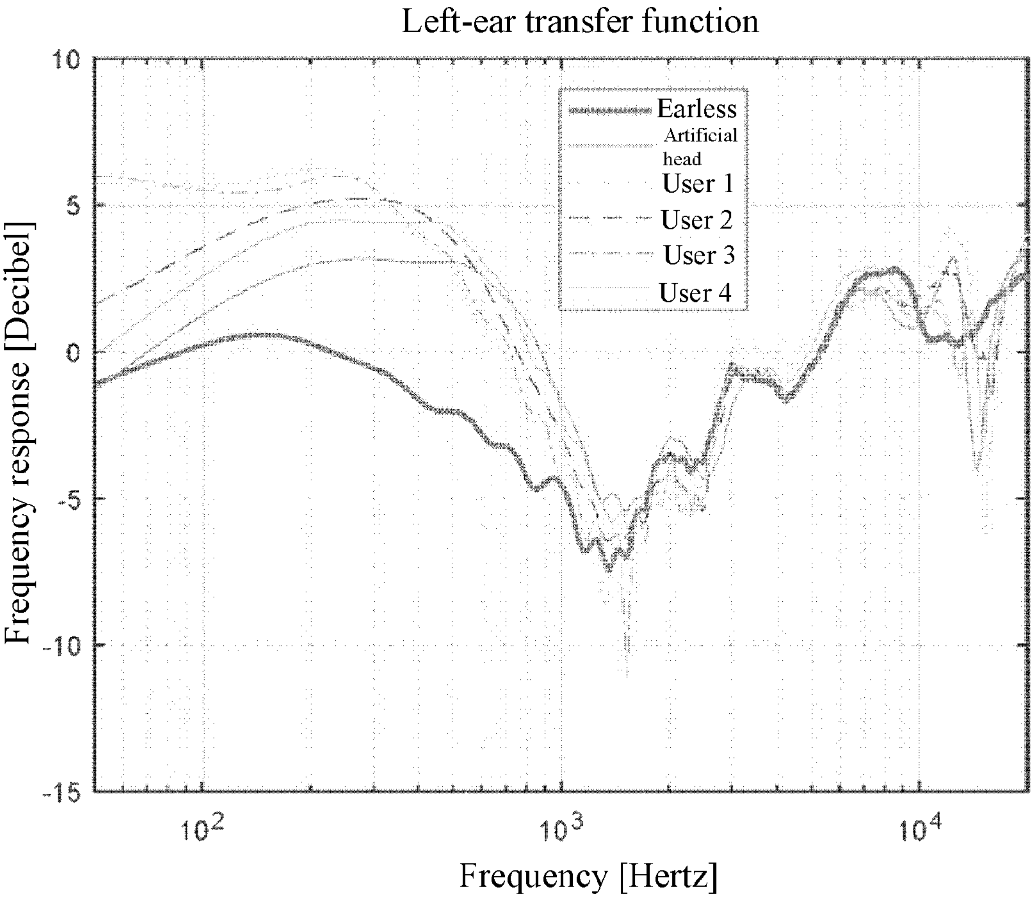
FIG. 3 shows a left-ear transfer function (TF) curve graph measured by a method according to an embodiment of the present disclosure.
Figure 4:
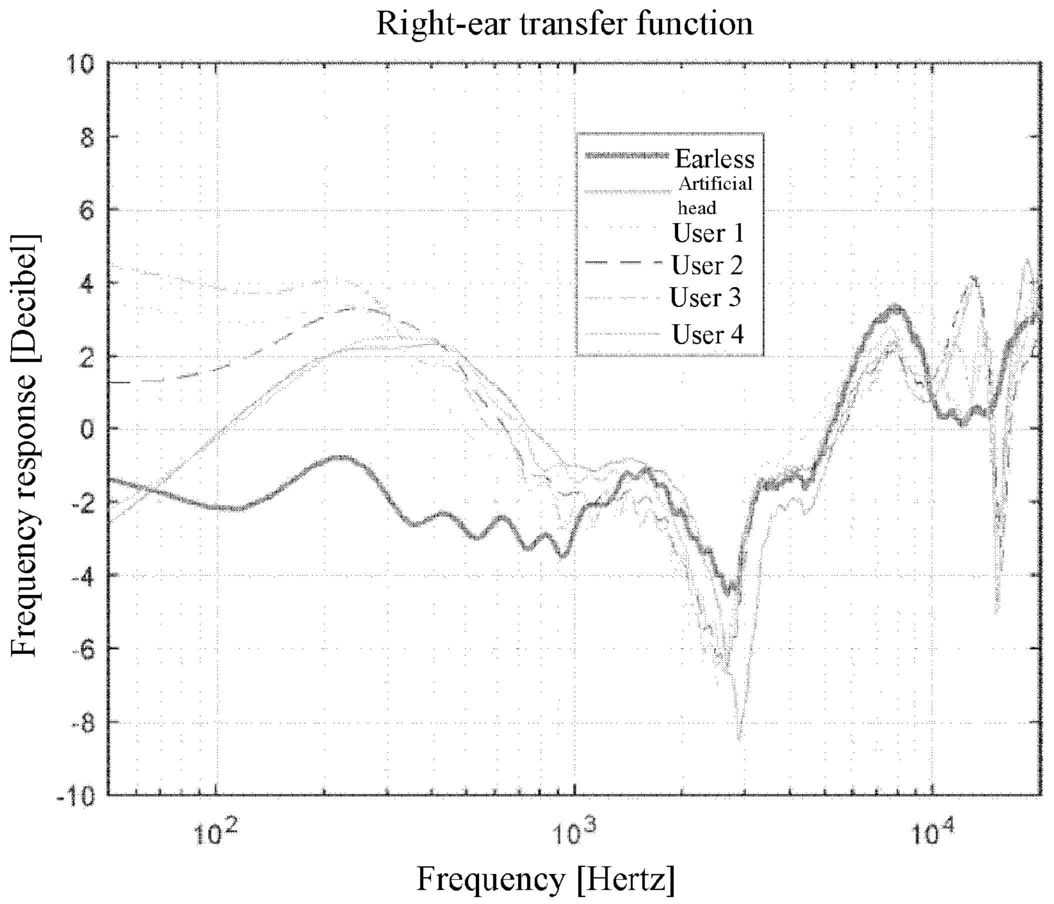
FIG. 4 shows a right-ear TF curve graph measured by a method according to an embodiment of the present disclosure.

FIGS. 3 and 4 are schematic diagrams of left-ear and right-ear HRTFs of a left-ear pinna identification and a right-ear pinna identification obtained respectively by ear-less measurement, different user measurement, and artificial head measurement in a method according to an embodiment of the present disclosure, respectively. The earless measurement includes: placing sound-absorbing foam on the top of an earshield of an earphone. It can be seen from FIGS. 3 and 4 that the method for HRTF adaptation of the present disclosure may obtain respective HRTFs (that is, different frequency response curves in the figures) based on earlessness, different users and artificial heads, so that personalized HRTF measurement of different test targets can be implemented.

Shadowing Identification (Far Field to EEP)

Figure 5:
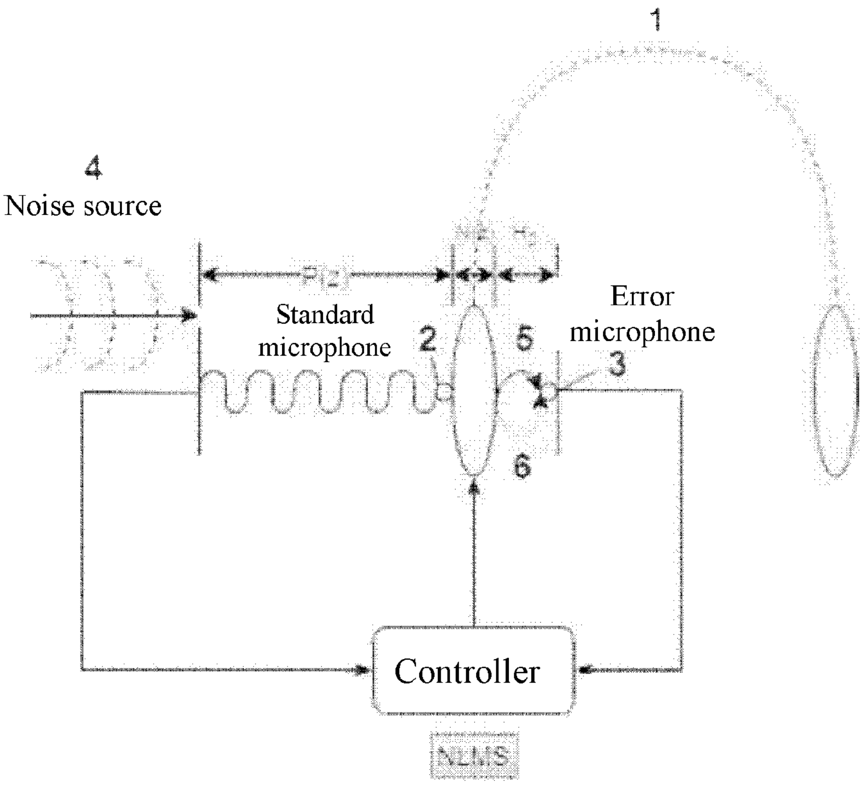
FIG. 5 illustrates a schematic diagram of an ANC feed-forward loop of another embodiment of the present disclosure.

A system model of the shadowing identification may be the same as a feedforward loop designed by an ANC. FIG. 5 shows a schematic diagram of an ANC feedforward loop. The system model of the shadowing identification of the present disclosure will take the ANC feedforward loop in FIG. 5 as an example for the convenience of understanding.

Given the combined binaural feedforward ANC, different HRTFs between left and right ERPs/EEPs describe a shadowing effect of the head, which will be separately and adaptively compensated according to a 3D audio.

A mono feedforward ANC shown in FIG. 5 is taken as an example. A far-field HRTF from a noise source to a reference microphone (ERP) and a near-field HRTF from the ERP to an error microphone (EEP) are shown in FIG. 5. The reference microphone and the error microphone usually have the same characteristics.

FIG. 5 illustrates various components and signal transmission paths of the mono feedforward ANC. Reference microphone 2 located outside earphone 1 is configured to measure the far-field HRTF. Error microphone 3 located inside earphone 1 is configured to measure the near-field HRTF. Noise 4 entering the system is filtered into signal 5 by the earshield of the earphone. Signal 6 played by an earphone speaker is preferably a reverse signal of signal 5. P(z) in the FIG. 5 represents the far-field HRTF from the noise source to the reference microphone (ERP). N(z) represents the low-pass characteristic of the earshield of the earphone, which has a passive isolation function. $H_0$ represents the near field HRTF from the earphone speaker (almost at the ERP) to the error microphone (EEP). The controller may be implemented as an AEC system, for example, the AEC system in FIG. 6. Similarly, those skilled in the art can understand that FIG. 6 only illustrates an adapted AEC using NLMS. The present disclosure may also use an AEC adapted loop using other adapted algorithms (such as RLS and VLMS).

Assuming that the noise source captured by reference microphone 2 will be regarded as a reference signal X(Z) and the signal captured by error microphone 3 will be regarded as an input signal Y(Z), it is finally estimated that an echo cancellation transfer function H(z) will be associated with N(z) (such as a low-pass filter in the FD) and $H_0$.

According to an aspect of the present disclosure, a priori estimation may be incorporated into the ANC feedforward loop to obtain better and more stable performance based on measurement results. In actual operation, the low-pass filter (for example, the cutoff frequency is 3 kHz) and $H_0$ derived through a feedback loop will be multiplied by the reference microphone signal X(Z) in the FD within the NLMS AEC system.

In a solution of the present disclosure, after a pinna identification and a shadowing identification are performed on the system, an obtained adapted HRTF may be applied to an ANC earphone to achieve accurate and personalized HRTF measurement and adaptation during the use of the ANC earphone. Further, a hybrid (feedback+feedforward) adapted ANC earphone design may be provided to adapt to different adaptation states.

System Compensation

For a 3D virtual surround earphone, for example, in order to finally reproduce the HRTF for a customer, reverse mapping is required to measure and map a near-field TF and an incomplete directional shadowing function to a 360-degree model. This process may be modeled as a sparsity problem in the field of statistical analysis. For example, a reference head model is used to collect a large number of near-field and far-field measurements and train a deep neural network (DNN). Data is collected in the form of impulse responses that are located around the space and have different degrees and distances.

Then, during calculation, the measured shadowing function and pinna response may be used as an input to generate a 360-degree HRTF rendering matrix to achieve a system compensation effect.

In the binaural hearing modeling research, the HRTF may generally be divided into two free-field spatial characteristics, namely a far field (for example, the distance is greater than 1.0 m) and a near field (for example, the distance is less than 1.0 m) according to the distance from the sound source to the center of the head. The manner in which the source of a free-field sound is determined mainly depends on the following three acoustic cues: (a) interaural time difference (ITD), (b) interaural intensity difference (ILD), and (c) acoustic filtering, that is, a spectrum cue derived from the shapes of the ears, head and body of a person. The near-field HRTF depends on a human body structure, especially an external ear structure composed of the pinna, the ear canal and the ear drum.

Figure 7:
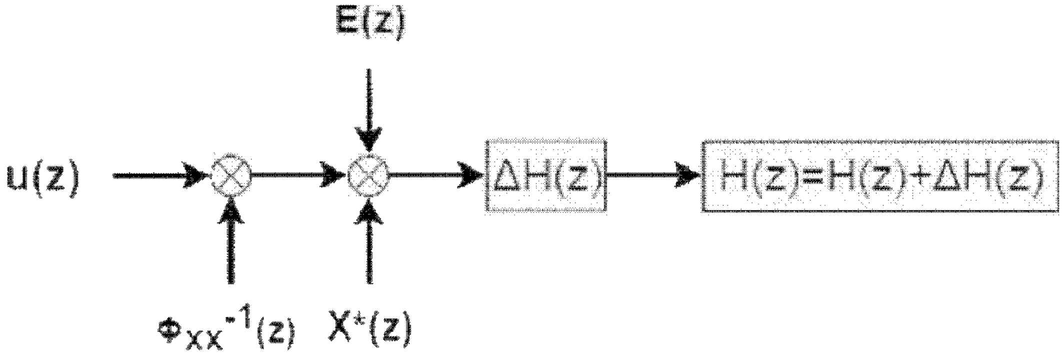
FIG. 7 illustrates a schematic diagram of acoustic echo cancellation system H(Z) adaptation implemented in an FD.

FIGS. 6 and 7 illustrate schematic diagrams of an acoustic echo cancellation system implemented in an FD and an adaptation process of H(Z) implementing the echo cancellation system, respectively. Those skilled in the art can understand that FIGS. 6 and 7 are intended to help understand the technology of the present disclosure, rather than limiting the technology of the present disclosure in a narrow sense. It will be further described below with reference to FIGS. 6 and 7.

The FD has become the first choice for an AEC, because the FD can implement a high-order adapted filter H(z) with high convergence speed and medium computational complexity. The two basic modules of NLMS AEC filtering and adaptation are shown in FIGS. 6 and 7. FIGS. 6 and 7 illustrate the case of a speaker-peripheral space-microphone (LEM) system. Those skilled in the art can understand that FIGS. 6 and 7 are intended to illustrate the basic principles through examples, rather than specific limitations.

In the FD, fast convolution/correlation technologies are usually used to implement the AEC. The cross-correlation between an error signal e(i) and a reference signal x(i) in the TD is equal to E(z) in the FD multiplied by X*(z) (X*(z) is the conjugate of X(z)). FIG. 7 shows that the reverse power spectrum density (PSD) of the reference signal $x(i)\Phi_{xx}^{-1}(z)$ is used as the normalization of gradient. A step size μ(z) in the FD guarantees the robustness of H(z).

An AEC version as shown in FIGS. 6 and 7 can only control a linear part of an LEM system, and additional residual echo suppression (RES) is usually used to further reduce echo to keep it within the range of a (linear) AEC error e(i). However, it is well known that the RES characterizes a non-linear signal processing stage and has inherent shortcomings. It may produce acoustic artifacts called musical tones, which need to be avoided.

The following is a brief description of some basic mathematical principles of NLMS AEC. Those skilled in the art can understand that the following description is only to help understand the basic principles of NLMS AEC, rather than specific limitations.

Based on Wiener-Khinchin and Parseval theorems, $$\Phi^{xx}(z)=X(z)\cdot X^*(z)$$

The adaptation of an echo canceller H(z) is implemented as follows, for example:

$$H(z)=H(z)+\mu(z)\frac{E(z)\cdot X^*(z)}{\Phi^{xx}(z)}=H(z)+\mu(z)\frac{E(z)}{X(z)}$$

An optimal step size $\mu_{opt}(z)$ is derived based on a relationship between E(z) and X(z), which will be simulated, analyzed and fine-tuned in practice. In practice, larger $\mu_{opt}(z)$ will converge quickly, but may cause instability. Smaller $\mu_{opt}(z)$ will converge slowly, but sometimes it cannot meet practical applications.

The present disclosure further provides a system, which includes a memory and a processor. The memory is configured to store computer-readable instructions. The processor is configured to perform a system identification when executing the computer-readable instructions. The system identification includes a pinna identification and a shadowing identification.

The description of the implementations has been presented for the purposes of illustration and description. Appropriate modifications and changes of the implementations can be implemented in view of the above description or can be obtained through practical methods. For example, unless otherwise indicated, one or more of the methods described may be performed by a combination of suitable devices and/or systems. The method can be performed in the following manner: using one or more logic devices (for example, processors) in combination with one or more additional hardware elements (such as storage devices, memories, circuits, hardware network interfaces, etc.) to perform stored instructions. The method and associated actions can also be executed in parallel and/or simultaneously in various orders other than the order described in this application. The system is illustrative in nature, and may include additional elements and/or omit elements. The subject matter of the present disclosure includes all novel and non-obvious combinations of the disclosed various methods and system configurations and other features, functions, and/or properties.

As used in this application, an element or step listed in the singular form and preceded by the word "one/a" should be understood as not excluding a plurality of said elements or steps, unless such exclusion is indicated. Furthermore, references to "one implementation" or "an example" of the present disclosure are not intended to be interpreted as excluding the existence of additional implementations that also incorporate the recited features.

The invention claimed is:

1. A method for head-related transfer function (HRTF) adaptation, comprising:

performing a system identification, the system identification comprising a pinna identification and a shadowing identification; and performing a system compensation based on an adapted HRTF obtained from the system identification;

wherein the system compensation comprises generating an HRTF rendering matrix based on an output of the pinna identification and the shadowing identification.

2. The method of claim 1, wherein the pinna identification comprises:

obtaining an adapted HRTF from an ear reference point (ERP) to an ear entrance point (EEP);

performing curve fitting to obtain a compensation curve of the HRTF, based on the adapted HRTF; and multiplying an audio signal in a frequency domain (FD) by the compensation curve of the HRTF.

3. The method of claim 2, wherein the compensation curve is an inversed function of the HRTF.

4. The method of claim 1, wherein the pinna identification is implemented by a feedback loop of an active noise canceller (ANC) including an adapted controller.

5. The method of claim 1, wherein the shadowing identification is implemented by a feedforward loop of an active noise canceller (ANC) including an adapted controller.

6. The method of claim 1, wherein the shadowing identification comprises:

inputting a first audio signal received from a reference microphone and a second audio signal received from an error microphone into an adapted controller, and obtaining an adapted HRTF.

7. The method of claim 6, further comprising: performing a system compensation by a hybrid output of the adapted HRTF obtained from the pinna identification and the adapted HRTF obtained from the shadowing identification.

8. A system for head-related transfer function (HRTF) adaptation, comprising:

a memory configured to store computer-readable instructions; and a processor configured to perform a system identification when executing the computer-readable instructions, the system identification comprising a pinna identification and a shadowing identification, wherein the processor is further configured to perform a system compensation based on an adapted HRTF obtained from the system identification, and wherein the processor is further configured to generate an HRTF rendering matrix based on an output of the pinna identification and the shadowing identification.

9. The system of claim 8, wherein the processor is further configured to perform the pinna identification by:

obtaining an adapted HRTF from an ear reference point (ERP) to an ear entrance point (EEP);

performing curve fitting to obtain a compensation curve of the HRTF based on the adapted HRTF; and multiplying an audio signal in a frequency domain (FD) by the compensation curve.

10. The system of claim 9, wherein the compensation curve is an inversed function of the HRTF.

11. The system of claim 8, wherein the processor is further configured to implement the pinna identification by a feedback loop of an active noise canceller (ANC) including an adapted controller.

12. The system of claim 8, wherein the processor is further configured to implement the shadowing identification by a feedforward loop of an active noise canceller (ANC) including an adapted controller.

13. The system of claim 8, wherein the processor is further configured to perform the shadowing identification by:

inputting a first audio signal received from a reference microphone and a second audio signal received from an error microphone into an adapted controller, and obtaining an adapted HRTF.

14. The system of claim 13, wherein the processor is further configured to perform a system compensation based on a hybrid output of the adapted HRTF obtained from the pinna identification and the adapted HRTF obtained from the shadowing identification.

15. A computer-program product embodied in a non-transitory computer read-able medium that is programmed for providing for head-related transfer function (HRTF) adaptation speech separation and being executed by a processor, the computer-program product comprising instructions for:

performing a system identification, the system identification comprising a pinna identification and a shadowing identification, and performing a system compensation based on an adapted HRTF obtained from the system identification;

wherein the system compensation comprises generating an HRTF rendering matrix based on an output of the pinna identification and the shadowing identification.

16. The computer-program product of claim 15, wherein the pinna identification comprises:

obtaining an adapted HRTF from an ear reference point (ERP) to an ear entrance point (EEP);

performing curve fitting to obtain a compensation curve of the HRTF, based on the adapted HRTF; and multiplying an audio signal in a frequency domain (FD) by the compensation curve of the HRTF.

* * * * *